(12) United States Patent
Doble et al.

(10) Patent No.: US 9,022,053 B2
(45) Date of Patent: May 5, 2015

(54) MOUNT FOR INLET CHECK VALVE

(75) Inventors: Cory J. Doble, West Harrison, IN (US); Paul C. Wetzel, Oxford, OH (US); Jason M. Crawford, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 585 days.

(21) Appl. No.: 13/414,384

(22) Filed: Mar. 7, 2012

(65) Prior Publication Data

US 2012/0227264 A1    Sep. 13, 2012

Related U.S. Application Data

(60) Provisional application No. 61/451,449, filed on Mar. 10, 2011.

(51) Int. Cl.
*F16K 43/00* (2006.01)
*B60K 15/04* (2006.01)
*F16K 15/03* (2006.01)

(52) U.S. Cl.
CPC ........... *B60K 15/04* (2013.01); *Y10T 29/49622* (2013.01); *Y10T 29/49947* (2013.01); *Y10T 29/49908* (2013.01); *F16K 15/033* (2013.01); *B60K 2015/0461* (2013.01); *B60K 2015/0477* (2013.01)

(58) Field of Classification Search
CPC ........... B60K 15/04; B60K 2015/0458; B60K 2015/0477; F16K 15/033; F16L 47/02
USPC .......... 137/15.09, 527.4, 527.6, 592; 285/137.11, 139.3, 141.1, 203, 204, 285/288.1, 288.11
See application file for complete search history.

(56) References Cited

U.S. PATENT DOCUMENTS

| | | | |
|---|---|---|---|
| 5,056,570 A | 10/1991 | Harris et al. | |
| 5,271,438 A | 12/1993 | Griffin et al. | |
| 5,390,808 A * | 2/1995 | Choma et al. | 220/86.2 |
| 5,668,828 A | 9/1997 | Sanderford, Jr. et al. | |
| 5,730,194 A | 3/1998 | Foltz | |
| 6,056,029 A | 5/2000 | Devall et al. | |
| 6,394,504 B1 * | 5/2002 | Brummans et al. | 285/136.1 |
| 6,808,209 B2 * | 10/2004 | Nakaya et al. | 285/55 |
| 7,147,001 B2 | 12/2006 | Gamble | |
| 7,267,376 B2 * | 9/2007 | Isayama et al. | 285/423 |
| 2005/0028873 A1* | 2/2005 | Martin et al. | 137/592 |
| 2005/0067027 A1* | 3/2005 | Kaneko | 137/592 |
| 2011/0284126 A1 | 11/2011 | Gamble et al. | |

\* cited by examiner

*Primary Examiner* — John K Fristoe, Jr.
*Assistant Examiner* — Reinaldo Sanchez-Medina
(74) *Attorney, Agent, or Firm* — Barnes & Thornburg LLP

(57) ABSTRACT

A fuel system includes a fuel tank filler neck associated with a fuel tank. The fuel tank filler neck includes a fill tube for receiving a fuel-dispensing pump nozzle and a fuel conductor interconnecting an interior region of the fuel tank and a passageway formed in the fill tube.

25 Claims, 7 Drawing Sheets

MOUNT FOR INLET CHECK VALVE

PRIORITY CLAIM

This application claims priority under 35 U.S.C. §119(e) to U.S. Provisional Application Ser. No. 61/451,449, filed Mar. 10, 2011, which is expressly incorporated by reference herein.

BACKGROUND

The present disclosure relates to a fuel system, and particularly to a fuel-delivery control system. More particularly, the present disclosure relates to a fuel tank valve apparatus comprising a fuel tank filler neck and an inlet check valve for regulating flow of liquid fuel and fuel vapor through the fuel tank filler neck.

A filler neck conducts liquid fuel from a fuel-dispensing pump nozzle to an interior fuel-storage region in a fuel tank. Although an opened passageway through the filler neck into the fuel tank is needed during refueling to conduct liquid fuel from the pump nozzle into the fuel tank, it is desirable to close the filler neck at other times to block discharge of liquid fuel and fuel vapor from the fuel tank through the filler neck. In many cases, a fuel cap is mounted on an outer end of the filler neck to close the filler neck during the time period before and after each tank refueling activity.

SUMMARY

According to the present disclosure, a fuel system comprises a fuel tank filler neck including a fuel conductor that is adapted to extend into an interior fuel-storage region of a fuel tank through an inlet aperture formed in the fuel tank. The fuel conductor includes a tubular housing and an inlet check valve apparatus.

In illustrative embodiments, the tubular housing is formed to include a fuel-transfer channel arranged in illustrative embodiments to receive liquid fuel flowing through a fill tube also included in the fuel tank filler neck and coupled to the fuel conductor. The inlet check valve apparatus includes a valve that is mounted for movement relative to a downstream end of the tubular housing to open and close a downstream fuel-discharge aperture opening into the fuel-transfer channel and communicating with the interior fuel-storage region of the fuel tank.

In illustrative embodiments, the fuel conductor further includes a tank mount comprising a spud anchor and a separate spud configured to be fastened to the spud anchor and adapted to be coupled to a fuel tank and a fill tube associated with the fuel tank. The spud anchor is coupled to a middle portion of the tubular housing to lie in a stationary position on the tubular housing in an illustrative assembly and installation process in accordance with the present disclosure. The spud is configured to be fastened to the spud anchor and adapted to mate with the fuel tank and formed to include a central channel sized to receive an upstream end of the tubular housing therein.

The spud is mounted on an upstream end of the tubular housing and coupled to the spud anchor to lie in a fixed position on the upstream end of the tubular housing using an assembly process in accordance with the present disclosure. The spud is configured to (1) mate with the fuel tank to support the tubular housing in a proper stationary position in the inlet aperture formed in the fuel tank and (2) mate with a fill tube included in the filler neck.

In illustrative embodiments, the spud anchor comprises an O-ring seal made, for example, of nitrile rubber (NBR) and a weld ring made, for example, of a weldable material such as high density polyethylene (HDPE), and a retainer. The spud anchor is coupled to a tubular housing also included in the fuel conductor and made of polyoxymethylene (POM) to establish a mechanical joint and a fluid leak barrier between the tubular housing and the spud anchor. The united tubular housing and the spud anchor cooperate to define a valve carrier carrying inlet check valve apparatus. In illustrative embodiments, the O-ring seal is placed into a channel formed in the tubular housing, the weld ring is pressed onto the tubular housing to engage and compress the O-ring seal to establish a fluid leak barrier between the weld ring and the tubular housing, and the retainer is coupled to the tubular housing to retain the weld ring in a stationary position on the tubular housing. The weld ring includes a spud-mount flange that is adapted to be fastened (e.g., welded) to the spud when the spud is coupled to the spud anchor.

In a first illustrative embodiment, the retainer is a spring made of an elastic stainless steel material. The retainer is installed on an exposed upstream portion of the weld ring to surround the tubular housing and snap into an annular groove formed in the tubular housing to create a mechanical joint between the weld ring and the tubular housing to ensure proper compression of the O-ring seal and establish the valve carrier.

In a second illustrative embodiment, a portion of the weld ring itself provides the retainer and is deformed (e.g., by application of heat) to flow into an annular groove formed in the tubular housing and then set to remain in the groove and create an interlocking mechanical joint between the weld ring and the tubular housing to ensure proper compression of the O-ring seal. Thus, the weld ring is retained in a stationary position on the tubular housing without the need for a separate retainer.

In an illustrative assembly and installation process, the spud is pressed onto the tubular housing to cause the upstream end of the tubular housing to pass through a central channel formed in the spud until the spud mates with the spud-mount flange of the weld ring included in the stationary spud anchor that has been coupled to the tubular housing. The spud is made, for example, of high-density polyethylene (HDPE). An interface between the spud and the spud-mount flange of the weld ring of the spud anchor is welded to create a mechanical joint and a fluid leak barrier between the spud and the spud anchor.

The downstream end of the tubular housing carrying the inlet check valve apparatus is inserted into the interior fuel-storage region of the fuel tank through the inlet aperture formed in the fuel tank. A downstream end of the spud is coupled to the fuel tank using any suitable means (e.g., welding) to retain the tubular housing in a fixed position relative to the fuel tank. The fill tube is coupled to an upstream end of the spud to cause a fuel-conducting passageway formed in the fill tube to lie in fluid communication with the fuel-transfer channel formed in the tubular housing.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 2 is an exploded perspective assembly view of a fuel conductor in accordance with the present disclosure showing, in series, from right to left, a fill-tube connector spud, a spud anchor cooperating with the fill-tube connector spud to form a tank mount and comprising (from right to left) a ring retainer, a weld ring, and an O-ring seal, a tubular housing including an annular O-ring seal holder provided in a middle portion of the tubular housing and formed to include an annular channel sized to receive the O-ring seal therein along with a tip of a sleeve included in the weld ring as suggested in FIG. 3, and an inlet check valve apparatus associating with a downstream end of the tubular housing and comprising a flapper-door valve, a valve mover, and a valve-mover biasing spring;

FIG. 3 is a cross-sectional view of the fuel conduit of FIG. 2 in combination with the fuel tank and fill tube of FIG. 1 showing the flapper-door valve in the closed position and suggesting that the tubular housing and the spud anchor cooperate to form a valve carrier on which the inlet check valve apparatus is mounted and showing that the spud is fastened (e.g., welded) to both of the spud anchor and the fuel tank to fix the tubular housing in a stationary position relative to the fuel tank coupled to a downstream end of the fill tube of FIG. 1;

FIG. 4 is a view similar to FIG. 3 showing the flapper-door valve in an opened position during refueling to allow liquid fuel flowing through the fill tube and the fuel conduit to flow into the interior fuel-storage region formed in the fuel tank;

FIG. 5 is an exploded perspective assembly view of another fuel conductor in accordance with the present disclosure showing, in series, from right to left, a fill-tube connector spud, a spud anchor cooperating with the fill-tube connector spud to form a tank mount and comprising a weld ring and an O-ring seal, a tubular housing including an annular O-ring seal holder provided in a middle portion of the tubular housing and formed to include an annular channel sized to receive the O-ring seal therein as suggested in FIG. 6, and an inlet check valve apparatus associating with a downstream portion of the tubular housing and comprising a flapper-door valve along with a tip of a sleeve included in the weld ring, a valve mover, and a valve-mover biasing spring;

FIG. 6 is a cross-sectional view of the fuel conduit of FIG. 5 in combination with the fuel tank and fill tube of FIG. 1 showing the flapper-door valve in the closed position and suggesting that the tubular housing and the spud anchor cooperate to form a valve carrier on which the inlet check valve apparatus is mounted and showing that the spud is fastened (e.g., welded) to both of the spud anchor and the fuel tank to fix the tubular housing in a stationary position relative to the fuel tank coupled to a downstream end of the fill tube of FIG. 1; and FIG. 7 is a view similar to FIG. 6 showing the flapper-door valve in an open position during refueling to allow liquid fuel flowing through the fill tube and the fuel conduit to flow into the interior fuel-storage region formed in the fuel tank.

DETAILED DESCRIPTION

Figure 1:
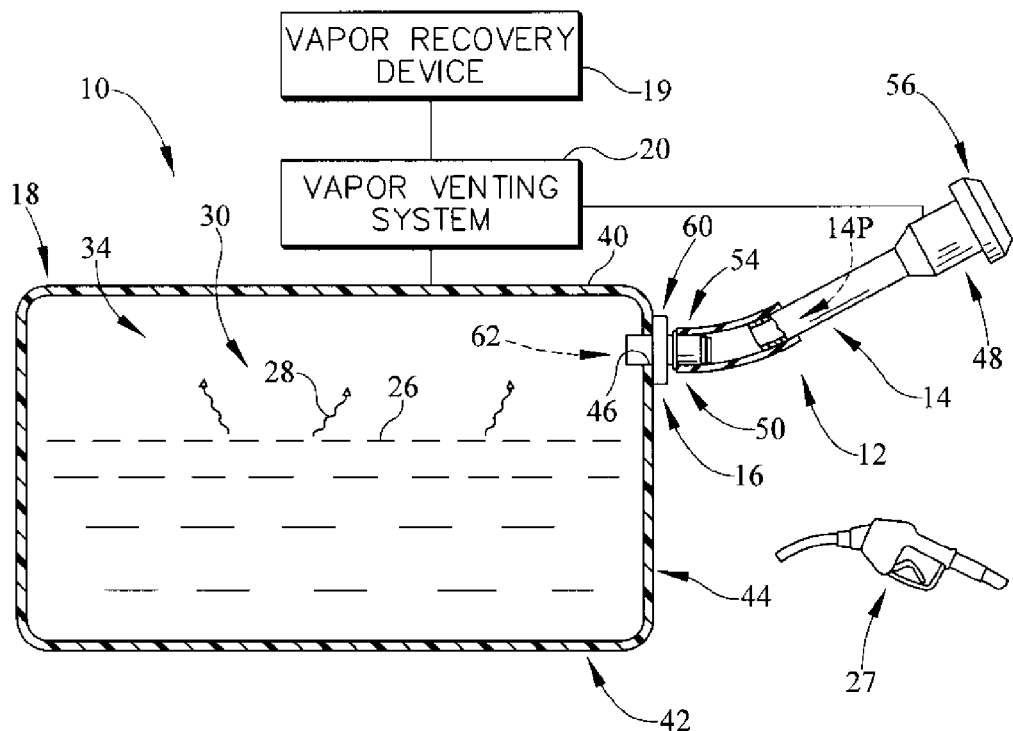
FIG. 1 is a diagrammatic view of a vehicle fuel system having a filler neck coupled to the fuel tank and showing that the filler neck includes a fill tube and a fuel conductor in accordance with the present disclosure interposed between and coupled to the fuel tank and the fill tube.
Figure 1A:
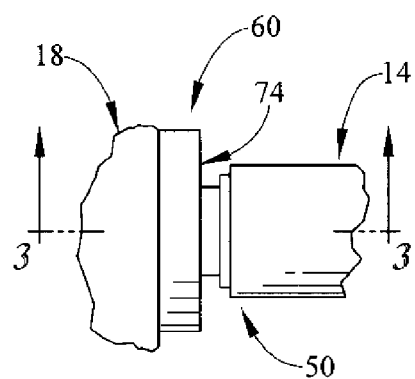
FIG. 1A is a partial top view of the fuel tank, fuel conductor, and fill tube of FIG. 1.

A fuel system 10 for use with a vehicle is shown in FIG. 1. Fuel system 10 includes a fuel tank 18, a vapor-venting system 20 coupled to fuel tank 18 and to a vapor-recovery device 19, and a filler neck 12. Filler neck 12 includes a fill tube 14 and a fuel conductor 16 coupled to fill tube 14 and to fuel tank 18 and to intercept and conduct liquid fuel flowing through fill tube 14 into fuel tank 18.

Fuel conductor 16 includes a tubular housing 70, an inlet check valve apparatus 62, and a tank mount 71 coupled to an exterior portion of tubular housing 70. Tank mount 71 is adapted to mate with an exterior surface of fuel tank 18 to support tubular housing 70 in a position extending into an interior fuel-storage region 30 formed in fuel tank 18 through an inlet aperture 46 formed in fuel tank 18 and locating inlet check valve apparatus 62 in fuel tank 18 near inlet aperture 46 as suggested in FIG. 1.

Figure 2:
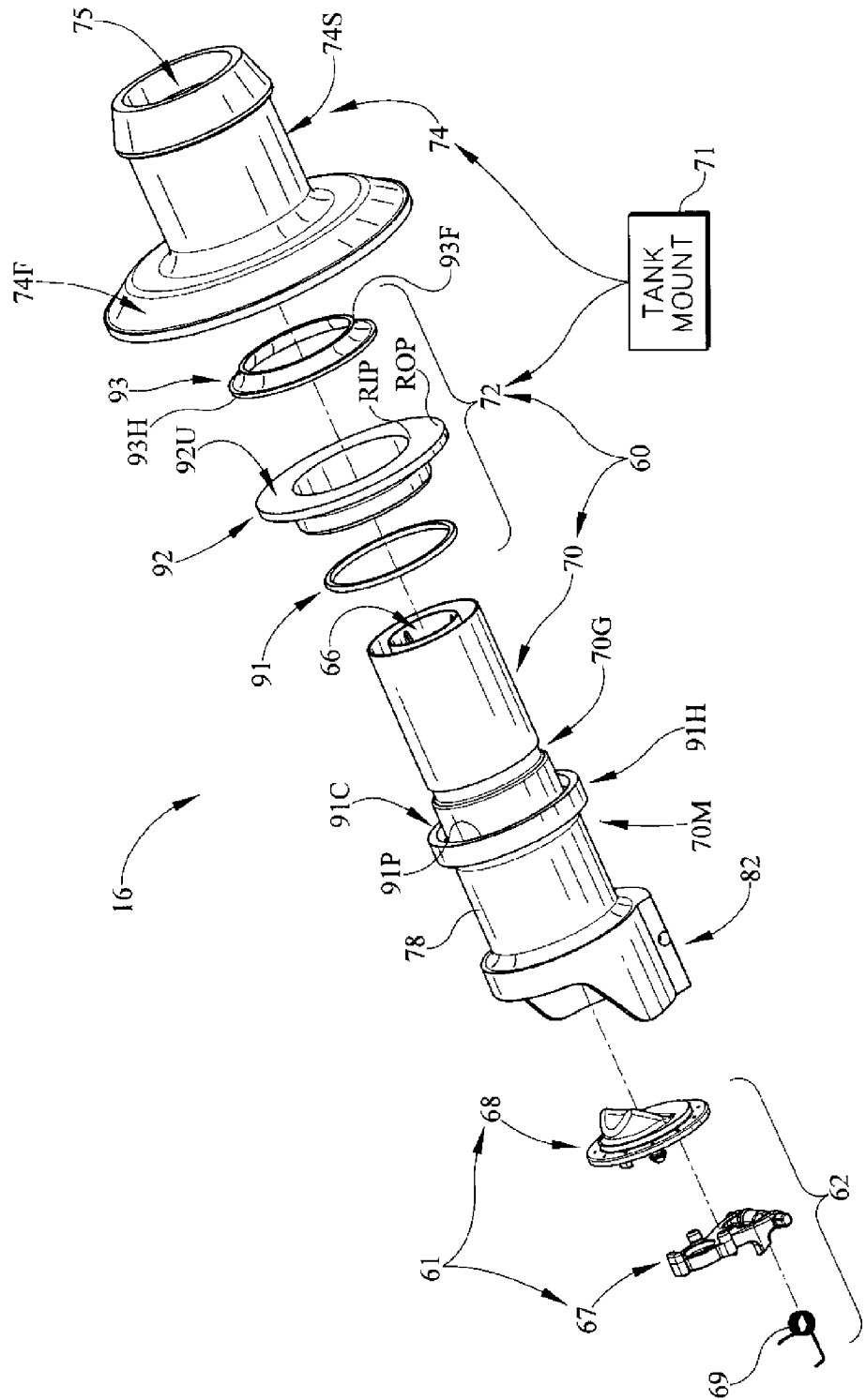
FIGS. 2-4 show a fuel conductor in accordance with a first embodiment of the present disclosure.
Figure 3:
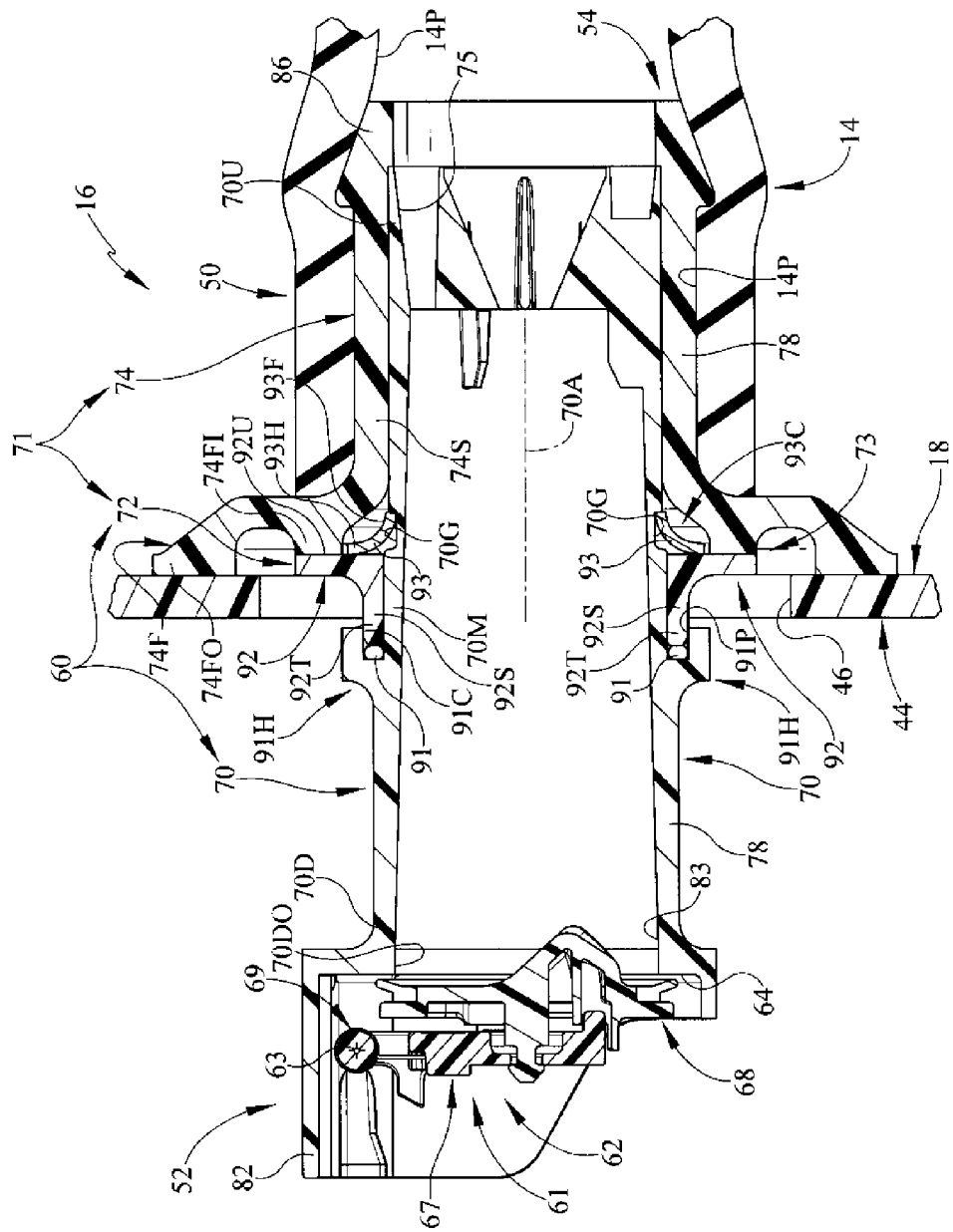

Tank mount 71 includes a spud anchor 72 comprising O-ring seal 91, weld ring 92, and a separate ring retainer 93 as suggested in FIGS. 2 and 3. Ring retainer 93 snaps into a groove 70G formed in tubular housing 70 to retain weld ring 92 on tubular housing 70 as suggested in FIG. 3. Tank mount 71 also includes a fill-tube connector spud 74 coupled to fill tube 14 and coupled to fuel tank 18 as suggested in FIG. 3. In another embodiment, a portion of weld ring 192 in another spud anchor 172 is configured to provide a ring retainer 193 adapted to flow (when heated) into a groove 70G formed in tubular housing 70 and remain in groove 70G (when cooled) to retain weld ring 192 on tubular housing 70 and compress O-ring seal 91 between tubular housing 70 and weld ring 192.

Fill tube 14 conducts liquid fuel 26 to fuel conductor 16 which regulates the flow of liquid fuel 26 and fuel vapor 28 between fill tube 14 and an interior fuel-storage region 30 of fuel tank 18. Vapor venting system 20 regulates venting of fuel vapor 28 extant in a vapor space 34 in interior fuel-storage region 30 of fuel tank 18 to vapor-recovery device 19 located outside of fuel tank 18.

Fuel tank 18 includes a top wall 40, a bottom wall 42 spaced apart from top wall 40, and a side wall 44 formed to include an inlet aperture 46 as shown, for example, in FIG. 1. Fuel conductor 16 is mounted to side wall 44 and arranged to extend or be extended through inlet aperture 46 as shown in FIG. 1. Fill tube 14 includes a mouth 48 at an outer end and a discharge outlet 50 at an inner end. Fuel conductor 16 has an outer end 54 (defined by tank mount 74) coupled to discharge outlet 50 of filler neck 14 and an inner end 52 (defined by tubular housing 70) arranged to extend into interior fuel-storage region 30 of fuel tank 18. Inlet check valve apparatus 62 is mounted on inner end 52 of tubular housing 70 and includes a pivotable closure 61 as suggested in FIGS. 3 and 4. Mouth 48 is formed to receive a fuel-dispensing pump nozzle 27 during tank refueling and a closure 56 at all times other than refueling.

Figure 4:
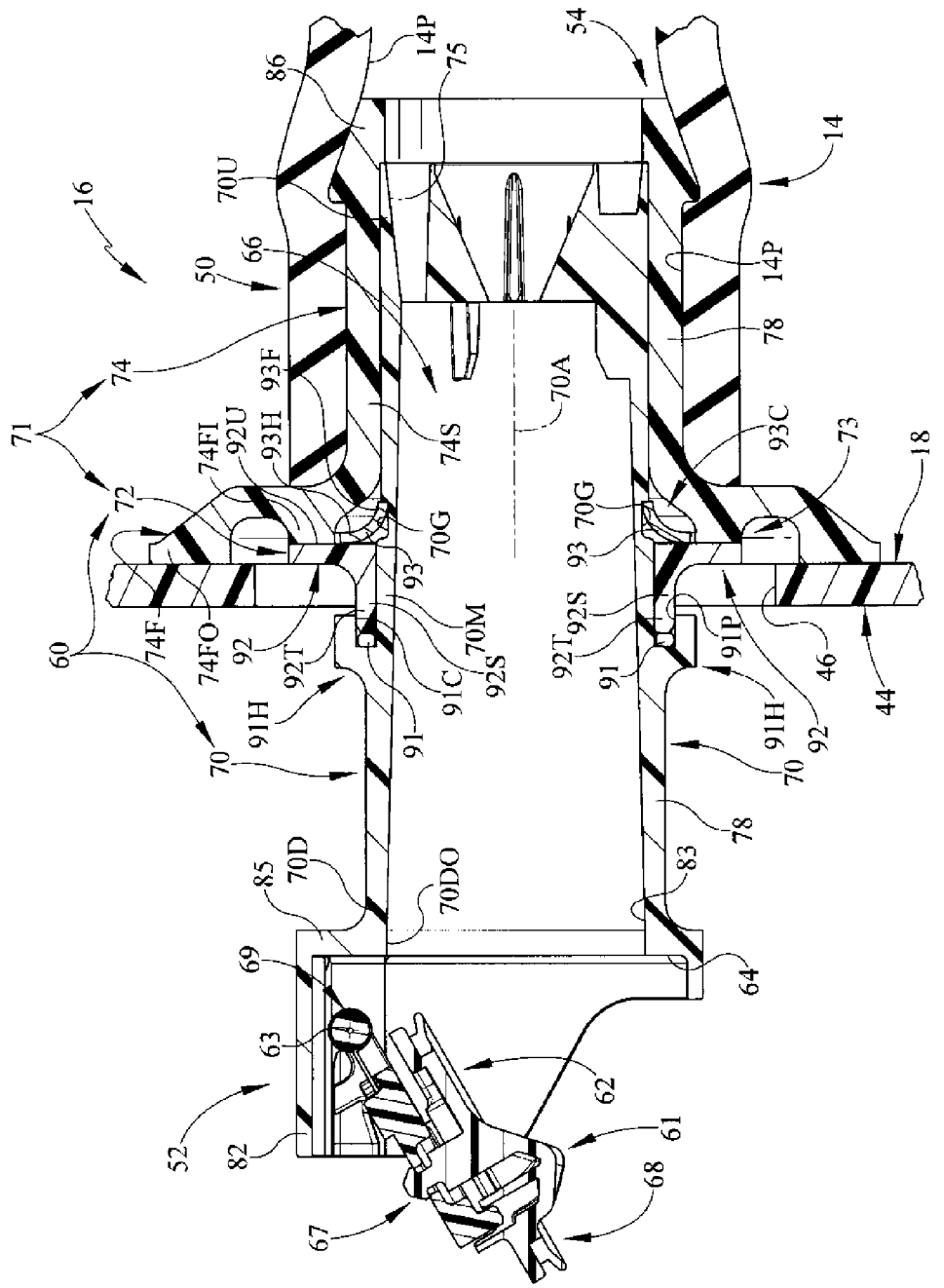

Fuel conductor 16 functions, for example, to conduct the flow of liquid fuel 26 into fuel tank 18 from fill tube 14 during tank refueling and to establish a barrier configured to block flow of liquid fuel and fuel vapor between fill tube 14 and fuel tank 18 at certain other times. Prior to refueling, fuel conductor 16 is configured to assume a closed state, as shown in FIG. 3. During refueling, fuel conductor 16 is configured to assume an opened state, as shown in FIG. 4, and conduct liquid fuel 26 dispensed into fill tube 14 into interior fuel-storage region 30 of fuel tank 18. After refueling, fuel conductor 16 is reconfigured to assume the closed state shown in FIG. 3.

In an illustrative embodiment shown in FIG. 2, fuel conductor 16 comprises a fill-tube connector spud 74 adapted to mate with fuel tank 18, a tubular housing 70, and a multi-part spud anchor 72. Tubular housing 70 has an upstream end 70U sized to extend through a central channel 75 formed in fill-tube connector spud 74. Spud anchor 72 is coupled to a middle portion 70M of tubular housing 70 in an illustrative embodiment as suggested in FIGS. 2 and 3. Tubular housing 70 and spud anchor 72 cooperate to form a valve carrier 60 as suggested in FIG. 2.

Fuel conductor 16 further includes an inlet check valve apparatus 62 comprising a flapper-door valve 68, a valve mover 67, and a valve-mover biasing spring 69 as suggested in FIG. 2. Inlet check valve apparatus 62 is coupled to tubular housing 70 included in valve carrier 60 as suggested in FIG. 3. It is within the scope of the present disclosure to use any suitable inlet check valve apparatus on valve carrier 60.

Fuel tank filler neck 12 includes a fuel conductor 16 that is adapted to extend into an interior fuel-storage region 30 of a fuel tank 18 through an inlet aperture 46 formed in fuel tank 18. Fuel conductor 16 includes a tubular housing 70 formed to include a fuel-transfer channel 66 and an inlet check valve apparatus 62 including a closure 61 that is mounted for movement relative to a downstream end 70D of tubular housing 70 to open and close a downstream fuel-discharge aperture opening into fuel-transfer channel 66 and communicating with interior fuel-storage region 30 of fuel tank 18 as suggested in FIGS. 3 and 4.

Fuel conductor 16 further includes a tank mount 71 comprising a stationary spud anchor 72 coupled to a middle portion 70M of tubular housing 70 and a fill-tube connector spud 74 adapted to mate with fuel tank 18 and formed to include a central channel 75 sized to receive an upstream end 70U of tubular housing 70 therein. Fill-tube connector spud 74 is mounted on an upstream end 70U of tubular housing 70 and coupled to spud anchor 72 to lie in a fixed position on the upstream end 70U of tubular housing 70. Fill-tube connector spud 74 is configured to mate with a fill tube 14 included in filler neck 12.

A spud anchor 72 included in tank mount 71 in accordance with a first embodiment of the present disclosure is shown in FIG. 2-4. Spud anchor 72 includes an O-ring seal 91 made of a sealing material such as nitrile rubber (NBR), a weld ring 92 made of a weldable material such as a high density polyethylene (HDPE), and a separate ring retainer 93 made of an elastic spring material such as stainless steel. O-ring seal 91 is inserted into an annular channel 91C formed in an annular O-ring seal holder 91H located in a middle portion 70M of tubular housing 70 as suggested in FIG. 3. A tip 92T of an annular sleeve 92S included in weld ring 92 is inserted into annular channel 91C and moved to compress O-ring seal 91. The O-ring seal 91 is thus located between tubular housing 70 and tip 92T of annular sleeve 92S of weld ring 92 and O-ring seal 91 will be compressed when weld ring 92 is fixed in a stationary position on tubular housing 70 by means of ring retainer 93 to provide a fluid leak barrier between tubular housing 70 and weld ring 92.

To compensate for different thermal expansion and swell characteristics of a first material used to form weld ring 92 and a different second material used to form tubular housing 70, retainer means is provided at the interface between weld ring 92 and tubular housing 70 for locking weld ring 92 in a stationary position on tubular housing 70. In the embodiment of FIGS. 2-4, an annular ring retainer 93 made of an elastic metal is placed on an exposed upstream portion of weld ring 92 and snapped into a radially outwardly opening annular groove 70G formed in tubular housing 70 to create a mechanical lock retaining weld ring 92 in a stationary position on and tubular housing 70 to compress O-ring seal 91 between tubular housing 70 and weld ring 92 as suggested in FIG. 3.

Figure 5:
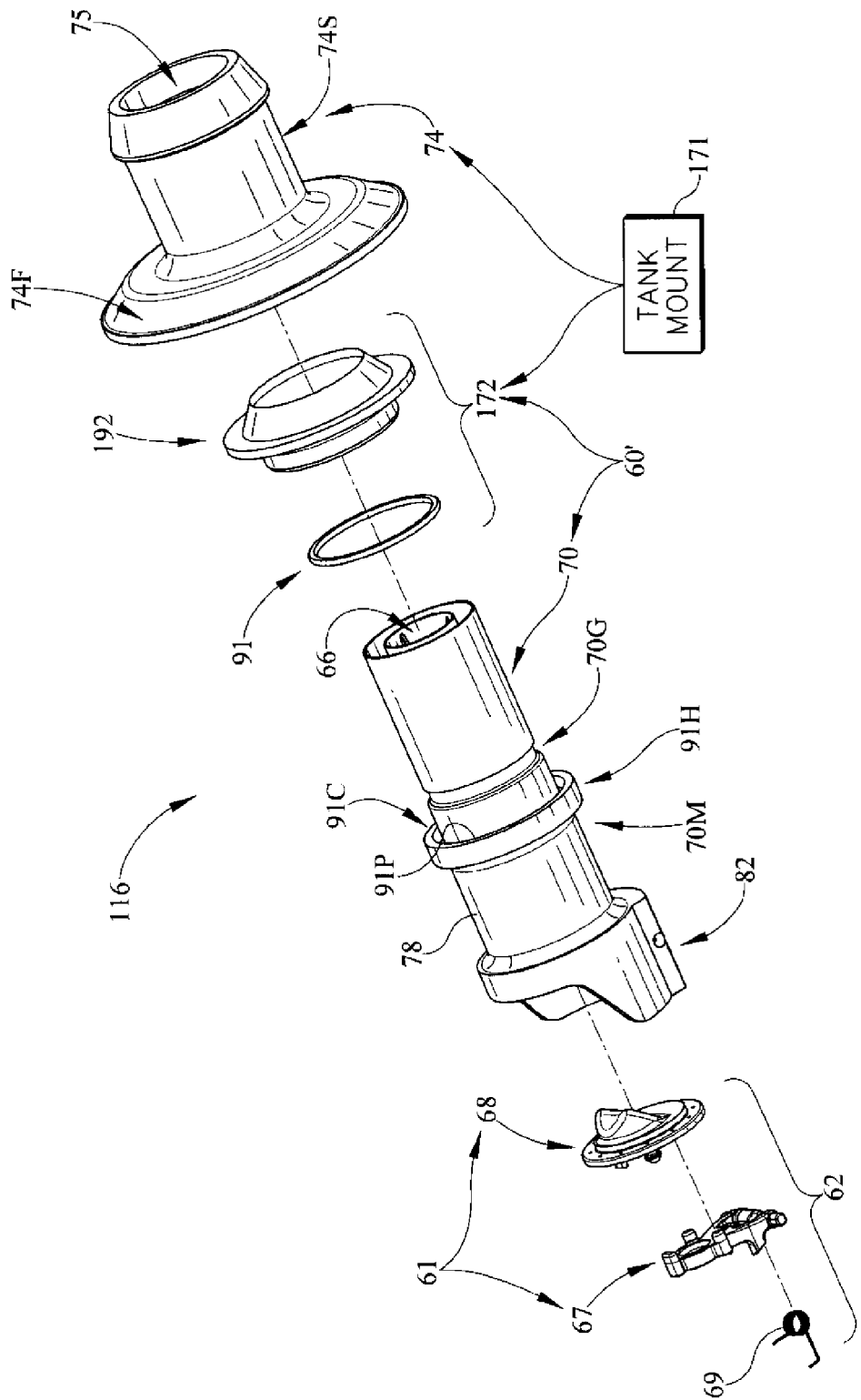
FIGS. 5-7 show a fuel conductor in accordance with a second embodiment of the present disclosure.
Figure 6:
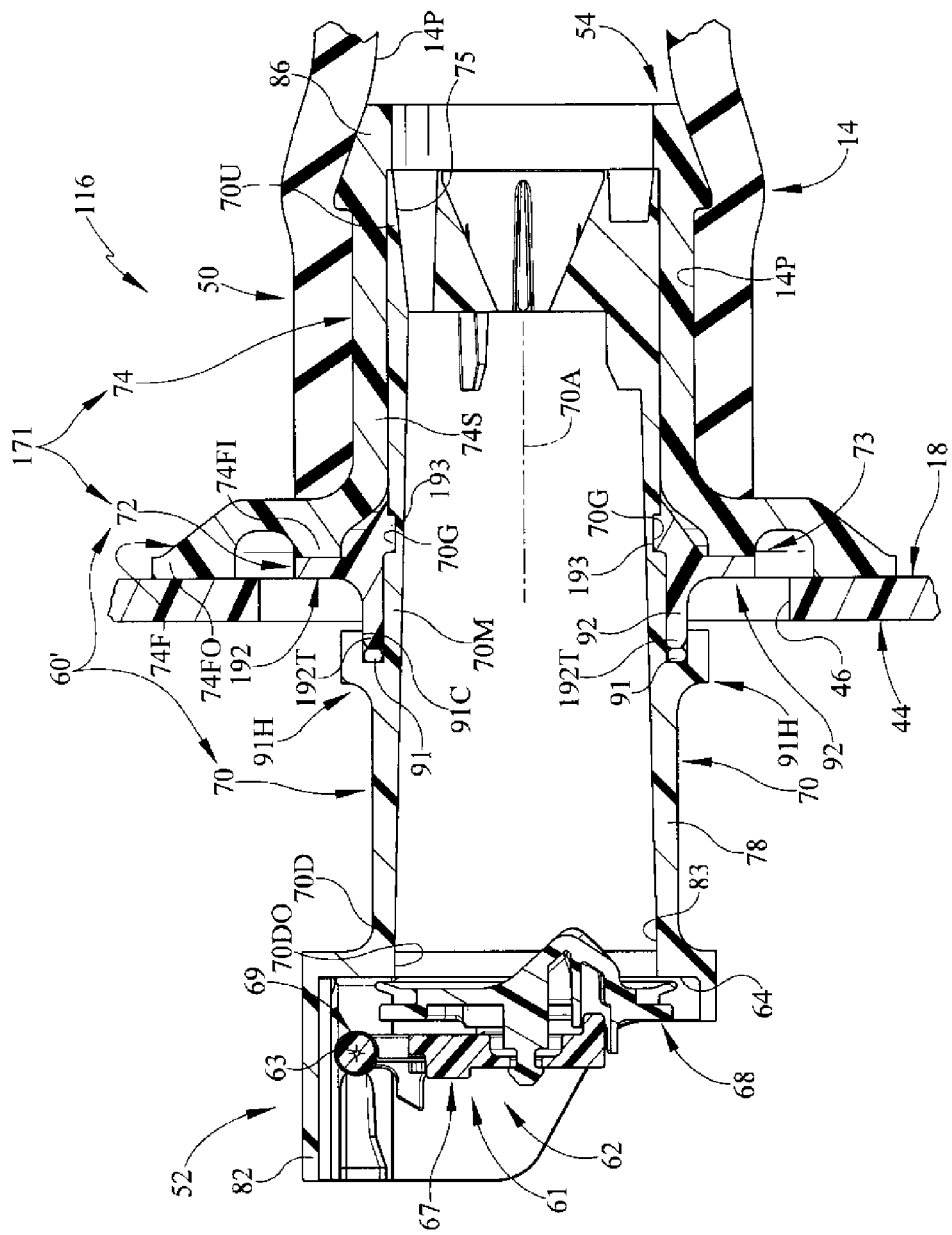
Figure 7:
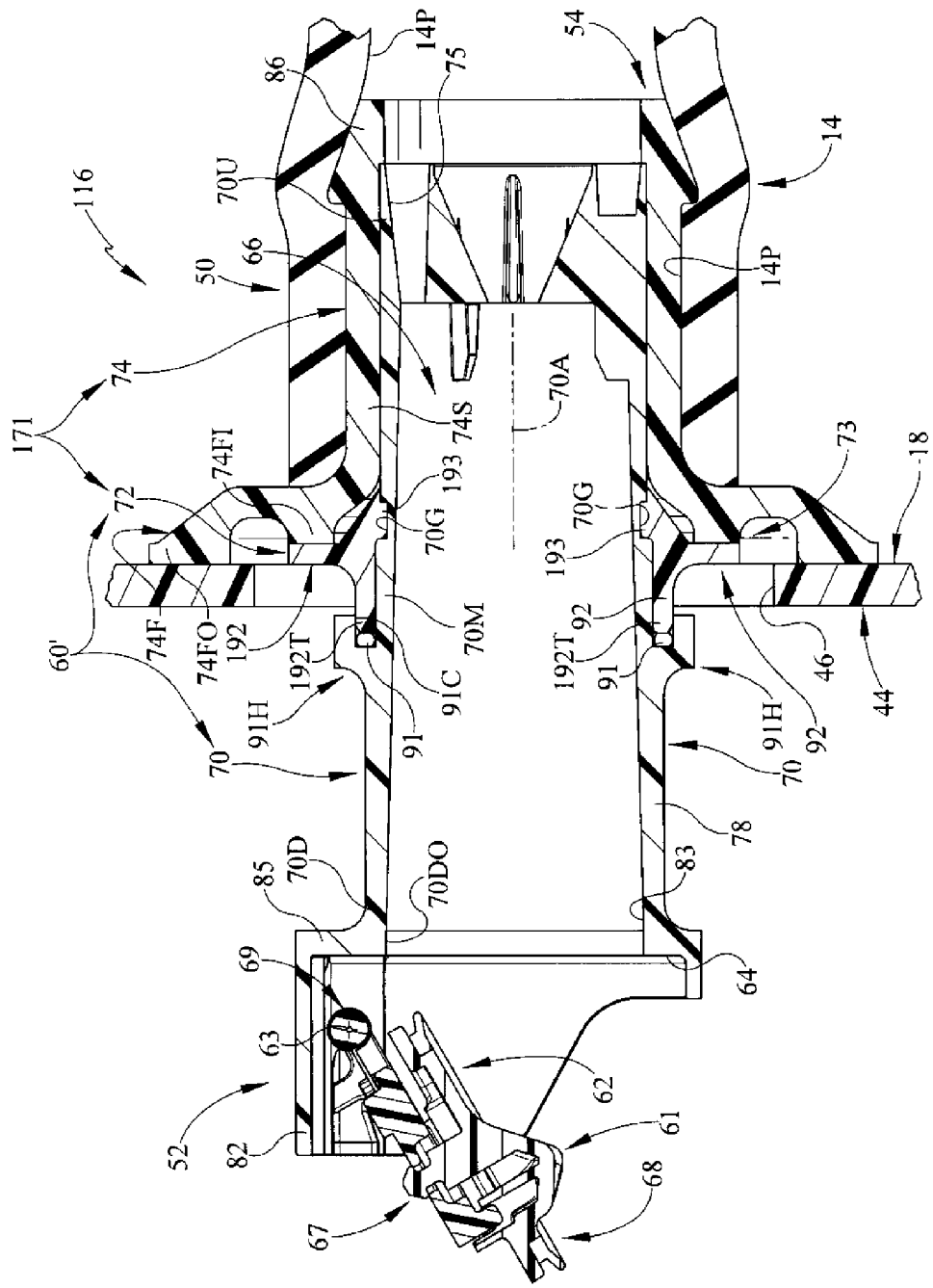

A spud anchor 172 in accordance with a second embodiment of the present disclosure is shown in FIGS. 5-7 and cooperates with tubular housing 70 to form a valve carrier 60. Spud anchor 172 includes an O-ring seal 91 made of a sealing material such as nitrile rubber (NBR) and a weld ring 192 made of a weldable material such as a high density polyethylene (HDPE). In this embodiment, the weld ring 192 is configured to provide a ring retainer 193 as shown in FIGS. 6 and 7.

A fuel conductor 116 illustrated in FIGS. 5-7 includes a spud anchor 172 and a spud 74 that cooperate to define a tank mount 171. Spud anchor 172 and tubular housing 70 cooperate to define a valve carrier 60 carrying inlet check valve apparatus 62.

O-ring seal 91 of spud anchor 172 is inserted into an annular channel 91C formed in an annular O-ring seal holder 91H located in a middle portion 70M of tubular housing 70 as suggested in FIG. 6. A tip of an annular sleeve 192S also included in weld ring 192 is inserted into annular channel 91C and moved to compress O-ring seal 91. The O-ring seal 91 is thus located between tubular housing 70 and weld ring 192 and O-ring seal 91 will be compressed when weld ring 192 is fixed in a stationary position on tubular housing 70 by means of ring retainer 193 to provide a fluid leak barrier.

To compensate for different thermal expansion and swell characteristics of a first material used to form weld ring 192 and a different second material used to form tubular housing 70, retainer means is provided at the interface between weld ring 192 and tubular housing 70 for locking weld ring 192 in a stationary position on tubular housing 70. In the embodiment of FIGS. 5-7, a ring retainer 193 included in weld ring 192 and coupled to an upstream portion of annular sleeve 192S is deformed (e.g., by exposure to heat sufficient to melt the material used to make weld ring) to flow radially inwardly into a radially outwardly opening annular groove 70G formed in tubular housing 70 and remain in annular grave 70G to create a mechanical lock between weld ring 192 and tubular housing 70 when the melted material later solidifies. The ring retainer 193 of weld ring 192 is formed using any suitable means to move inwardly toward tubular housing 70 to flow into annular groove 70G formed in tubular housing 70 to create a mechanical lock retaining weld ring 192 in a stationary position on tubular housing 70 to compress O-ring 91 between tubular housing 70 and weld ring 192 as suggested in FIG. 6.

In illustrative embodiments, fill-tube connector spud 74 is pressed onto tubular housing 70 at a later stage of the manufacturing process to cause the upstream end 70U of tubular housing 70 to pass through central channel 75 formed in fill-tube connector spud 74 until spud 74 mates with the stationary spud anchor 72 coupled to tubular housing 70. An interface 73 provided between fill-tube connector spud 74 and spud anchor 72 is welded to create a mechanical joint and a fluid leak barrier between fill-tube connector spud 74 and spud anchor 72.

Downstream end 70D of tubular housing 70 carrying inlet check valve apparatus 62 is inserted into interior fuel-storage region 30 of fuel tank 18 through inlet aperture 46 formed in fuel tank 18. Fill-tube connector spud 74 is coupled to fuel tank 18 using any suitable means (e.g., welding) to retain tubular housing 70 in a fixed position relative to fuel tank 18. Fill tube 14 is coupled to fill-tube connector spud 74 to cause a fuel-conducting passageway formed in fill tube 14 to lie in fluid communication with fuel-transfer channel 66 formed in tubular housing 70 and arranged to communicate with interior fuel-storage region 30 formed in fuel tank 18 when flapper-door valve 68 of inlet check valve apparatus 62 is in the opened position. In an illustrative embodiment, fill-tube connector spud 74 has a multilayer construction and comprises an EVOH center layer and an HDPE outer layer.

Fuel conductors 16, 116 function, for example, to conduct the flow of liquid fuel 26 into fuel tank 18 from fill tube 14 to establish a barrier configured to block flow of liquid fuel and fuel vapor between fill tube 14 and fuel tank 18 at certain times. Prior to refueling, fuel conductor 16 is configured to assume a closed state, as shown in FIG. 3. During refueling, fuel conductor 16 is configured to assume an opened state, as shown in FIG. 4, and conduct liquid fuel 26 dispensed into fill tube 14 into interior fuel-storage region 30 of fuel tank 18. After refueling, fuel conductor 16 is reconfigured to assume the closed state shown in FIG. 3. Fuel conductor 116 is shown in an opened state in FIG. 6 and a closed state in FIG. 7.

Fuel conductor 16 includes a valve carrier 60 comprising tubular housing 70 and a spud anchor 72 coupled to tubular housing 70 and an inlet check valve apparatus 62 as suggested in FIGS. 2 and 3. Inlet check valve apparatus 62 is coupled to valve carrier 60 and includes a closure 61 that is mounted for pivotable movement between a closed position shown in FIG. 3 and an opened position shown in FIG. 4. In the closed position, fuel and fuel vapor are not allowed to flow between fuel tank 18 and fill tube 14 through fuel conductor 16. However, in the opened position, fuel and fuel vapor are allowed to flow through fuel conductor 16. Fuel conductor 116 includes a valve carrier 60 comprising a tubular housing 70 and a spud anchor 172 coupled to tubular housing 70 as suggested in FIGS. 5 and 6.

Tubular housing 70 included in valve carrier 60 is formed to include a valve seat 64 and a fuel-transfer channel 66 terminating at the valve seat 64 as shown, for example, in FIG. 3. Valve carrier 60 is adapted to be coupled to fill tube 14 and fuel tank 18 as suggested, for example, in FIGS. 1, 3, and 4 to conduct fuel from fill tube 14 to fuel tank 18 through fuel-transfer channel 66 during vehicle refueling. Closure 61 of inlet check valve apparatus 62 is pivotable about a pivot axis 63 (see FIG. 4) relative to tubular housing 70 of valve carrier 60 to the closed position as shown in FIG. 3 to engage valve seat 64 to block discharge of fuel from fuel-transfer channel 66 into fuel tank 18. Inlet check valve apparatus 62 can also pivot about pivot axis 63 to the opened position as shown in FIG. 4 to disengage valve seat 64 to allow discharge of fuel from fuel-transfer channel 66 into fuel tank 18.

Tank inlet check valve apparatus 62 comprises a flapper-door valve 68, a valve mover 67, and a valve-mover biasing spring 69 as shown, for example, in FIGS. 2-4. Valve mover 67 and flapper-door valve 68 cooperate to define a closure 61. Flapper-door valve 68 is configured to mate with valve seat 64 provided in tubular housing 70 of valve carrier 60. Valve mover 67 is pivotably coupled to tubular housing 70 of valve carrier 60 at pivot axis 63 to carry flapper-door valve 68 toward and away from valve seat 64. Valve-mover biasing spring 69 yieldably urges valve mover 67 so as to bias flapper-door valve 68 normally to the closed position shown in FIG. 4. In an illustrative embodiment, flapper-door valve 68 includes an annular sealing gasket made of a fluorosilicone material overmolded onto a valve plate made of a nylon material. Valve-mover biasing spring 69 is a torsion spring made of a stainless steel material. Valve mover 67 is made of a polyoxymethylene (POM) material.

In the illustrated embodiment, valve carrier 60 includes a tubular housing 70 and a spud anchor 72 coupled to tubular housing 70 in a first manner suggested in FIGS. 2 and 3. Valve carrier 60 includes an alternative spud anchor 172 coupled to tubular housing 70 in a second manner suggested in FIGS. 6 and 7. Tubular housing 70 is made, for example, of polyoxymethylene (POM). Weld ring 91 included in spud anchor 72 (and weld ring 192 included in spud anchor 172) is made of a weldable material such as, for example, high-density polyethylene (HDPE) so that it can be welded to fill-tube connector spud 74 also made of a weldable HDPE so that it can be welded to spud anchor 72 and to fuel tank 18 to support tubular housing 70 in a fixed position in inlet aperture 46 formed in fuel tank side wall 44. Closure 61 of inlet check valve apparatus 62 is coupled to tubular housing 70 for pivotable movement about pivot axis 63 in the illustrated embodiment. Valve mover 67 of closure 61 was designed to be snap-fit to valve carrier 60 in an illustrative embodiment and is made of the same material as tubular housing 70.

Tubular housing 70 includes a pipe 78 having a cylindrical interior wall 80 defining a boundary of fuel-transfer channel 66 as shown, for example, in FIG. 3. One end 81 of pipe 78 is open to receive fuel from a fuel-conducting passageway formed in fill tube 14. Valve seat 64 is formed at an opposite downstream end 83 of pipe 78 to define an opening through which fuel is discharged from fuel-transfer channel 66 into interior fuel-storage region 30 of fuel tank 18 when closure 61 of inlet check valve apparatus 62 is moved to the opened position as shown, for example, in FIG. 4.

Tubular housing 70 also includes an outer sleeve 82 configured to surround a downstream portion of pipe 78, which portion is formed to include valve seat 64, as shown, for example, in FIG. 3. Tubular housing 70 further includes a radially outwardly extending annular O-ring seal holder annular O-ring seal holder 91H coupled to an exterior surface of pipe 78 at middle portion 70M and arranged to mate with spud anchor 72 during the fuel conduit assembly process.

Sleeve 82 includes a proximal end 85 coupled to pipe 78 to retain sleeve 82 in a cantilevered position relative to valve seat 64 as suggested in FIG. 3. A ramped collar 86 forming a sealing barb is provided on upstream end 81 of pipe 78 as shown in FIG. 3 for expanding fill tube 14 radially outwardly as fill tube 14 is coupled to fill-tube connector spud 74.

As disclosed herein, a weld ring 92 (or 192) is pressed onto tubular housing 70 and secured with a ring retainer 93 in a tubular housing groove 70G as suggested in FIGS. 2-4 (or by forming ring retainer 193 included in weld ring 192 to extend into groove 70G) to mechanically lock weld ring 92 (or 192) is welded to fill-tube connector spud 74 to create a mechanical joint and a fluid leak barrier. O-ring seal 91 is compressed in channel 91C between tubular housing 70 and weld ring 92 (or 192) to provide a fluid leak barrier and maintain internal loading between tubular housing 70 and weld ring 92 (or 192) during thermal and fuel swell cycling.

Illustrative processes of assembling a portion of a fuel tank filler neck 14 in accordance with the present disclosure are suggested in FIGS. 2-7 and comprise the steps of providing a tubular housing 70 made of a first plastics material and formed to include a fuel-transfer channel 66 extending from a downstream end 70D thereof to an upstream end 70U thereof and mounting an inlet check valve apparatus 62 on downstream end 70D of the tubular housing to regulate flow of liquid fuel and fuel vapor through an outlet 70DO formed in tubular housing 70 to open into fuel-transfer channel 66. Each process further comprises the step of clamping a spud anchor 72 onto an exterior portion of tubular housing 70 to locate spud anchor 72 in a stationary position on tubular housing 70 to provide a fluid-leak barrier therebetween. Spud anchor 72 is made of a second plastics material that is different than the first plastics material used to make tubular housing 70 and is configured to be welded to a fuel tank 18. In illustrative embodiments, the first material is polyoxymethylene (POM) and the second material is high-density polyethylene (HDPE).

In illustrative embodiments, a process in accordance with the present disclosure further comprises the step of coupling a spud 74 to spud anchor 72 to form a tank mount 71. Tank mount 71 is configured to provide means for mating with a fuel tank 18 to support tubular housing 70 in an aperture 46 formed in fuel tank 18 to position downstream end 70D of tubular housing 70 in communication with an interior fuel-storage region 30 formed in fuel tank 18 and to position upstream end 70U of tubular housing 70 outside of fuel tank 18 to communicate with a fill tube 14 associated with fuel tank 18.

The clamping step in accordance with the present disclosure comprises the steps of inserting an O-ring seal 91 into an annular channel 91C formed in tubular housing 70 and moving a tip 92T of a weld ring 92 made of the second plastics material into annular channel 91C to compress O-ring seal 91 as suggested in FIG. 3. Similar inserting and moving steps apply to tip 192T of weld ring 192 as suggested in FIG. 6 in another illustrative embodiment.

Tubular housing 70 includes a pipe 78 formed to include fuel-transfer channel 66 and an O-ring holder 91H coupled to an exterior portion of pipe 78 and arranged to cooperate with pipe 78 to define therebetween annular channel 91C that receives O-ring seal 91. O-ring holder 91H has an annular shape and is arranged to surround pipe 78. O-ring holder 91H is formed to include an annular port 91P opening into annular channel 91C and facing toward spud 74. Tip 92T of weld ring 92 extends through annular port 91P to contact O-ring seal 91 as suggested in FIG. 3. Similarly, tip 192T of weld ring 192 extends through port 91P to contact O-ring seal 91 as suggested in FIG. 6.

The clamping step in accordance with the present disclosure further comprises the step of moving a ring retainer 93 into a groove 70G formed in tubular housing 70 to apply a load to O-ring seal 91 via weld ring 92 as suggested in FIG. 3. Once installed, ring retainer 93 maintains O-ring seal 91 under compression to provide the fluid-leak barrier between spud anchor 72 and tubular housing 70. A ring retainer 93 is illustrated in FIGS. 2-4 and an alternative ring retainer 193 is illustrated in FIGS. 5-7. Ring retainer 193 is included in weld ring 192 and moved into groove 70G as suggested in FIG. 6 to compress O-ring seal 91 and provide the fluid-leak barrier.

In accordance with an illustrative process suggested in FIGS. 2-4, the moving step includes the steps of providing a ring retainer 93 made of an elastic spring material and placing a foot 93F included in ring retainer 93 in groove 70G formed in tubular housing 70 to act against a portion of tubular housing 70 while a head 93H included in ring retainer 93 communicates with weld ring 92 to maintain ring retainer 93 under compression so as to apply a loading force to weld ring 92 that is transferred by weld ring 92 to O-ring seal 91 to maintain O-ring seal 91 under compression between tubular housing 70 and weld ring 92 as suggested in FIG. 3. Ring retainer 93 is nozzle-shaped and includes a wide-diameter end providing head 93H mating with the weld ring and a relatively narrower narrow-diameter end providing foot 93F mating with an edge included in tubular housing 70 and arranged to bound a portion of groove 70G.

Weld ring 92 includes an upstream surface 92U facing away from O-ring seal 91 as suggested in FIGS. 2 and 3. A radially outer portion ROP of upstream surface 92U mates with and is fastened to spud 74 to define a tank mount 71 adapted to be fastened to a fuel tank 18 to support tubular housing 70 in aperture 46 formed in fuel tank 18. A radially inner portion RIP of upstream surface 92U located between radially outer portion ROP and tubular housing 70 mates with the wide-diameter end 93H of ring retainer 93.

Spud 74 includes a tank-mount shaft 74S arranged to extend along and around upstream end 70U of tubular housing 70 and a mount flange 74F coupled to tank-mount shaft 74S as suggested in FIGS. 2 and 3. Mount flange 74F is formed to include an inner pad 74FI mating with weld ring 92 and an outer pad 74FO adapted to mate with and be fastened to fuel tank 18. Ring retainer 93 is located in a retainer chamber 93C bounded by tubular housing 70, weld ring 92, inner pad 74FI of mount flange 74F, and tank-mount shaft 74S.

Tubular housing 70 includes a pipe 78 formed to include fuel-transfer channel 66 and an O-ring holder 91H coupled to an exterior portion of pipe 78 and arranged to cooperate with pipe 78 to define therebetween annular channel 91C that receives O-ring seal 91 as suggested in FIG. 3. O-ring holder 91H is formed to include an annular port 91P opening into annular channel 91C and facing toward spud 74. Tip 92T of weld ring 92 extends through annular port 91P to contact O-ring seal 91. Ring retainer 93 is located outside of annular channel 91C formed in O-ring holder 91H.

In accordance with another illustrative process suggested in FIGS. 5-7, a downstream portion of weld ring 192 defines the tip 192T that contacts O-ring seal 91. The moving step in accordance with this alternative embodiment of the present disclosure includes the steps of locating an upstream portion 193 of weld ring 192 above an opening into the groove 70G formed in tubular housing 70 and deforming upstream portion 193 of weld ring 192 to flow into and remain in groove 70G formed in tubular housing 70 and anchor to a portion of tubular housing 70 bounding the groove 70G to maintain the weld ring 192 in a fixed position on tubular housing 70 so as to apply a loading force via tip 192T to maintain O-ring seal 91 under compression between tubular housing 70 and weld ring 192 as suggested in FIGS. 5 and 6.

The deforming step includes the steps of heating upstream portion 193 of weld ring 192 to cause it to flow into the groove 70G formed in tubular housing 70 and then cooling upstream portion 193 of weld ring 192 in the groove 70G to cause upstream portion 193 of weld ring 192 to remain in the groove 70G as suggested in FIGS. 5 and 6. Spud 74 includes a tank-mount shaft 74S arranged to extend along and around upstream end 70U of tubular housing 70 and a mount flange 74F coupled to tank-mount shaft 74S. Mount flange 74F is formed to include an inner pad 74FI mating with weld ring 192 and an outer pad 74FO adapted to mate with and be fastened to fuel tank 18.

Tubular housing 70 includes a pipe 78 formed to include fuel-transfer channel 66 and an O-ring holder 91H coupled to an exterior portion of pipe 78 and arranged to cooperate with pipe 78 to define therebetween annular channel 91C that receives O-ring seal 91 as suggested in FIGS. 6 and 7. O-ring holder 91H is formed to include an annular port 91P opening into annular channel 91C and facing toward spud 74. Tip 92T of weld ring 92 extends through annular port 91P to contact O-ring seal 91. Ring retainer 193 is located outside of annular channel 92C formed in O-ring holder 91H.

In illustrative embodiments, the coupling step in accordance with all embodiments of the present disclosure comprises the steps of passing upstream end 70U of tubular housing 70 through a central channel 75 formed in spud 74 until spud 74 mates with spud anchor 72 and fastening spud anchor 72 to spud anchor 72. The coupling step further comprises the steps of inserting downstream end 70D of tubular housing 70 carrying inlet check valve apparatus 62 into interior fuel-storage region 30 of fuel tank 18 through inlet aperture 46 formed in fuel tank 18 and fastening spud 74 to fuel tank 18 to retain tubular housing 70 in a fixed position relative to fuel tank 18.

In illustrative embodiments, the process in accordance with all embodiments of the present disclosure further comprises the step of coupling fill tube 14 to spud 74 to cause a fuel-conducting passageway 14P formed in fill tube 14 to lie in fluid communication with fuel-transfer channel 66 formed in tubular housing 70 to communicate with interior fuel-storage region 30 in fuel tank 18 when closure 61 included in inlet check valve apparatus 62 is moved relative to tubular housing 70 from a closed position blocking a downstream fuel-discharge aperture 70DO formed in downstream end 70D of tubular housing 70 to an opened position opening downstream fuel-discharge aperture 70DO formed in downstream end 70.

Spud anchor 72 is clamped in illustrative embodiments onto an exterior portion of tubular housing 70 to locate spud anchor 72 in a stationary position on tubular housing 70 to be coupled to a fill-tube connector spud 74 that is arranged to be coupled to fuel tank 18 and a fill tube 14 associated with fuel tank 18. The clamping step comprises the steps of moving an upstream portion of spud anchor 72 into a groove 70G formed in tubular housing 70 to compress a downstream portion of spud anchor 72 against tubular housing 70 to establish the fluid-leak barrier therebetween. O-ring seal 91 is included in the downstream portion of spud anchor 72 and arranged to engage tubular housing 70. The clamping step further comprises the steps of inserting the O-ring seal 91 into an annular channel 91C formed in tubular housing 70 and moving the tip 92T of weld ring 92 into annular channel 92 to compress O-ring seal 91.

In illustrative embodiments suggested in FIGS. 2-4, the moving step includes the steps of providing a ring retainer 93 made of an elastic spring material and placing a foot 93F included in ring retainer 93 in the groove 70G formed in tubular housing 70 to act against a portion of tubular housing 70 while a head 93H included in ring retainer 93 communicates with weld ring 92 to maintain ring retainer 93 under compression between O-ring seal 91 and ring retainer 93 so as to apply a loading force to weld ring 92 that is transferred by weld ring 92 to O-ring seal 91 to maintain O-ring seal 91 under compression between tubular housing 70 and weld ring 92.

The moving step in the illustrative embodiments suggested in FIGS. 5-7 includes the step of locating an upstream portion 193 of weld ring 192 above an opening into the groove 70G formed in tubular housing 70 and deforming the upstream portion 193 of weld ring 192 to flow into and remain in the groove 70G formed in tubular housing 70 and anchor to a portion of tubular housing 70 bounding groove 70G to maintain weld ring 192 in a fixed position on tubular housing 70 so as to apply a loading force via the tip 192T to maintain O-ring seal 91 under compression between tubular housing 70 and weld ring 192. The deforming step includes the steps of heating upstream portion 193 of weld ring 192 to cause it to flow into the groove 70G formed in tubular housing 70 and then cooling upstream portion 193 of weld ring 192 in the groove 70G to cause upstream portion 193 of weld ring 192 to remain in the groove 70G.

The invention claimed is:

1. A process of assembling a portion of a fuel tank filler neck, the process comprising the steps of
providing a tubular housing made of a first plastics material and formed to include a fuel-transfer channel extending from a downstream end thereof to an upstream end thereof,
mounting an inlet check valve apparatus on the downstream end of the tubular housing to regulate flow of liquid fuel and fuel vapor through an outlet formed in the tubular housing to open into the fuel-transfer channel,
providing a tank mount comprising a spud anchor and a fill tube connector spud, the spud anchor comprising a weld ring made of a second plastics material that is different than the first plastics material and an O-ring seal,
clamping the spud anchor onto an exterior surface of the tubular housing to locate the spud anchor in a stationary position on the tubular housing to provide a fluid-leak barrier therebetween, and
coupling the fill tube connector spud to the spud anchor to form a tank mount configured to provide means for mating with a fuel tank to support the tubular housing in an aperture formed in the fuel tank to position the downstream end of the tubular housing in communication with an interior fuel-storage region formed in the fuel tank and to position the upstream end of the tubular housing outside of the fuel tank to communicate with a fill tube associated with the fuel tank.

2. The process of claim 1, wherein the clamping step comprises the steps of inserting the O-ring seal into an annular channel formed in the tubular housing and moving a tip of a weld ring made of the second plastics material into the annular channel to compress the O-ring seal.

3. The process of claim 2, wherein the tubular housing includes a pipe formed to include the fuel-transfer channel and an O-ring holder coupled to an exterior portion of the pipe and arranged to cooperate with the pipe to define therebetween the annular channel that receives the O-ring seal.

4. The process of claim 3, wherein the O-ring holder has an annular shape and is arranged to surround the pipe.

5. The process of claim 3, wherein the O-ring holder is formed to include an annular port opening into the annular channel and facing toward the spud and the tip of the weld ring extends through the annular port to contact the O-ring seal.

6. The process of claim 1, wherein the coupling step comprises the steps of passing the upstream end of the tubular housing through a central channel formed in the spud until the spud mates with the spud anchor and fastening the spud anchor to the spud to create a mechanical joint and a fluid-leak barrier between the spud and the spud anchor.

7. The process of claim 6, wherein the coupling step further comprises the steps of inserting the downstream end of the tubular housing carrying the inlet check valve apparatus into the interior fuel-storage region of the fuel tank through the inlet aperture formed in the fuel tank and fastening the spud to the fuel tank to retain the tubular housing in a fixed position relative to the fuel tank.

8. A process of assembling a portion of a fuel tank filler neck, the process comprising the steps of
providing a tubular housing made of a first plastics material and formed to include a fuel-transfer channel extending from a downstream end thereof to an upstream end thereof,
mounting an inlet check valve apparatus on the downstream end of the tubular housing to regulate flow of liquid fuel and fuel vapor through an outlet formed in the tubular housing to open into the fuel-transfer channel,
clamping a ring-shaped spud anchor made of a second plastics material that is different than the first plastics material and is configured to be welded to a fuel tank onto an exterior portion of the tubular housing to locate the ring-shaped spud anchor in a stationary position on the tubular housing to provide a fluid-leak barrier therebetween, coupling a spud to the ring-shaped spud anchor to form a tank mount configured to provide means for mating with a fuel tank to support the tubular housing in an aperture formed in the fuel tank to position the downstream end of the tubular housing in communication with an interior fuel-storage region formed in the fuel tank and to position the upstream end of the tubular housing outside of the fuel tank to communicate with a fill tube associated with the fuel tank, wherein the clamping step comprises the steps of inserting an O-ring seal into an annular channel formed in the tubular housing and moving a tip of a weld ring made of the second plastics material into the annular channel to compress the O-ring seal, and wherein the clamping step further comprises the step of moving a ring retainer into a groove formed in the tubular housing to apply a load to the O-ring seal via the weld ring and maintain the O-ring seal under compression to provide the fluid-leak barrier between the ring-shaped spud anchor and the tubular housing.

9. The process of claim 8, wherein the moving step includes the steps of providing a ring retainer made of an elastic spring material and placing a foot included in the ring retainer in the groove formed in the tubular housing to act against a portion of the tubular housing while a head included in the ring retainer communicates with the weld ring to maintain the ring retainer under compression so as to apply a loading force to the weld ring that is transferred by the weld ring to the O-ring seal to maintain the O-ring seal under compression between the tubular housing and the weld ring.

10. The process of claim 9, wherein the ring retainer is nozzle-shaped and includes a wide-diameter end providing the head and mating with the weld ring and a relatively narrower narrow-diameter end providing the foot and mating with an edge included in the tubular housing and arranged to bound a portion of the groove.

11. The process of claim 10, wherein the weld ring includes an upstream surface facing away from the O-ring seal, a radially outer portion of the upstream surface mates with and is fastened to the spud to define a tank mount adapted to be fastened to a fuel tank to support the tubular housing in the aperture formed in the fuel tank, and a radially inner portion of the upstream surface located between the radially outer portion and the tubular housing mates with the wide-diameter end of the ring retainer.

12. The process of claim 9, wherein the spud includes a tank-mount shaft arranged to extend along and around the upstream end of the tubular housing and a mount flange coupled to the tank-mount shaft and formed to include an inner pad mating with the weld ring and an outer pad adapted to mate with and be fastened to the fuel tank.

13. The process of claim 9, wherein the tubular housing includes a pipe formed to include the fuel-transfer channel and an O-ring holder coupled to an exterior portion of the pipe and arranged to cooperate with the pipe to define therebetween the annular channel that receives the O-ring seal, the O-ring holder is formed to include an annular port opening into the annular channel and facing toward the spud and the tip of the weld ring extends through the annular port to contact the O-ring seal, and the ring retainer is located outside of the annular channel formed in the O-ring holder.

14. The process of claim 8, wherein a downstream portion of the weld ring defines the tip that contacts the O-ring seal and the moving step includes the steps of locating an upstream portion of the weld ring above an opening into the groove formed in the tubular housing and deforming the upstream portion of the weld ring to flow into and remain in the groove formed in the tubular housing and anchor to a portion of the tubular housing bounding the groove to maintain the weld ring in a fixed position on the tubular housing so as to apply a loading force via the tip to maintain the O-ring seal under compression between the tubular housing and the weld ring.

15. The process of claim 14, wherein the deforming step includes the steps of heating the upstream portion of the weld ring to cause it to flow into the groove formed in the tubular housing and then cooling the upstream portion of the weld ring in the groove to cause the upstream portion of the weld ring to remain in the groove.

16. The process of claim 14, wherein the spud includes a tank-mount shaft arranged to extend along and around the upstream end of the tubular housing and a mount flange coupled to the tank-mount shaft and formed to include an inner pad mating with the weld ring and an outer pad adapted to mate with and be fastened to the fuel tank and wherein the ring retainer is located in a retainer chamber bounded by the tubular housing, the weld ring, the inner pad of the mount flange, and the tank-mount shaft.

17. The process of claim 14, wherein the tubular housing includes a pipe formed to include the fuel-transfer channel and an O-ring holder coupled to an exterior portion of the pipe and arranged to cooperate with the pipe to define therebetween the annular channel that receives the O-ring seal, the O-ring holder is formed to include an annular port opening into the annular channel and facing toward the spud and the tip of the weld ring extends through the annular port to contact the O-ring seal, and the ring retainer is located outside of the annular channel formed in the O-ring holder.

18. A process of assembling a portion of a fuel tank filler neck, the process comprising the steps of providing a tubular housing made of a first plastics material and formed to include a fuel-transfer channel extending from a downstream end thereof to an upstream end thereof, mounting an inlet check valve apparatus on the downstream end of the tubular housing to regulate flow of liquid fuel and fuel vapor through an outlet formed in the tubular housing to open into the fuel-transfer channel, clamping a ring-shaped spud anchor made of a second plastics material that is different than the first plastics material and is configured to be welded to a fuel tank onto an exterior portion of the tubular housing to locate the ring-shaped spud anchor in a stationary position on the tubular housing to provide a fluid-leak barrier therebetween, coupling a spud to the ring-shaped spud anchor to form a tank mount configured to provide means for mating with a fuel tank to support the tubular housing in an aperture formed in the fuel tank to position the downstream end of the tubular housing in communication with an interior fuel-storage region formed in the fuel tank and to position the upstream end of the tubular housing outside of the fuel tank to communicate with a fill tube associated with the fuel tank, wherein the coupling step comprises the steps of passing the upstream end of the tubular housing through a central channel formed in the spud until the spud mates with the spud anchor and fastening the spud anchor to the spud to create a mechanical joint and a fluid-leak barrier between the spud and the spud anchor, wherein the coupling step further comprises the steps of inserting the downstream end of the tubular housing carrying the inlet check valve apparatus into the interior fuel-storage region of the fuel tank through the inlet aperture formed in the fuel tank and fastening the spud to the fuel tank to retain the tubular housing in a fixed position relative to the fuel tank, and further comprising the step of coupling the fill tube to the spud to cause a fuel-conducting passageway formed in the fill tube to lie in fluid communication with the fuel-transfer channel formed in the tubular housing to communicate with the interior fuel-storage region in the fuel tank when a closure included in the inlet check valve apparatus is moved relative to the tubular housing from a closed position blocking a downstream fuel-discharge aperture formed in the downstream end of the tubular housing to an opened position opening the downstream fuel-discharge aperture formed in the downstream end.

19. A process of assembling a portion of a fuel tank filler neck, the process comprising the steps of providing a tubular housing of a first plastics material and formed to include a fuel-transfer channel extending from a downstream end thereof to an upstream end thereof, the tubular housing forming an annular channel, mounting an inlet check valve apparatus on the downstream end of the tubular housing to regulate flow of liquid fuel and fuel vapor through an outlet formed in the tubular housing to open into the fuel-transfer channel, clamping a spud anchor of a second plastics material and included in a tank mount onto an exterior portion of the tubular housing so that a portion of the spud anchor is inserted into the annular channel to locate the spud anchor in a stationary position on the tubular housing to be coupled to a fill-tube connector spud also included in the tank mount and arranged to be coupled to the fuel tank and a fill tube associated with the fuel tank.

20. The process of claim 19, wherein the clamping step comprises the steps of moving an upstream portion of the spud anchor into a groove formed in the tubular housing to compress a downstream portion of the spud anchor against the tubular housing to establish the fluid-leak barrier therebetween.

21. The process of claim 20, wherein an O-ring seal is included in the downstream portion of the spud anchor and arranged to engage the tubular housing.

22. The process of claim 21, wherein the downstream portion of the spud anchor further includes a tip of a weld ring and the clamping step further comprises the steps of inserting the O-ring seal into an annular channel formed in the tubular housing and moving the tip of the weld ring into the annular channel to compress the O-ring seal.

23. A process of assembling a portion of a fuel tank filler neck, the process comprising the steps of providing a tubular housing formed to include a fuel-transfer channel extending from a downstream end thereof to an upstream end thereof, mounting an inlet check valve apparatus on the downstream end of the tubular housing to regulate flow of liquid fuel and fuel vapor through an outlet formed in the tubular housing to open into the fuel-transfer channel, clamping a spud anchor included in a tank mount onto an exterior portion of the tubular housing to locate the spud anchor in a stationary position on the tubular housing to be coupled to a fill-tube connector spud also included in the tank mount and arranged to be coupled to the fuel tank and a fill tube associated with the fuel tank, wherein the clamping step comprises the steps of moving an upstream portion of the spud anchor into a groove formed in the tubular housing to compress a downstream portion of the spud anchor against the tubular housing to establish the fluid-leak barrier therebetween, wherein an O-ring seal is included in the downstream portion of the spud anchor and arranged to engage the tubular housing, wherein the downstream portion of the spud anchor further includes a tip of a weld ring and the clamping step further comprises the steps of inserting the O-ring seal into an annular channel formed in the tubular housing and moving the tip of the weld ring into the annular channel to compress the O-ring seal, and wherein the moving step includes the steps of providing a ring retainer made of an elastic spring material and placing a foot included in the ring retainer in the groove formed in the tubular housing to act against a portion of the tubular housing while a head included in the ring retainer communicates with the weld ring to maintain the ring retainer under compression between the O-ring seal and the ring retainer so as to apply a loading force to the weld ring that is transferred by the weld ring to the O-ring seal to maintain the O-ring seal under compression between the tubular housing and the weld ring.

24. A process of assembling a portion of a fuel tank filler neck, the process comprising the steps of providing a tubular housing formed to include a fuel-transfer channel extending from a downstream end thereof to an upstream end thereof, mounting an inlet check valve apparatus on the downstream end of the tubular housing to regulate flow of liquid fuel and fuel vapor through an outlet formed in the tubular housing to open into the fuel-transfer channel, clamping a spud anchor included in a tank mount onto an exterior portion of the tubular housing to locate the spud anchor in a stationary position on the tubular housing to be coupled to a fill-tube connector spud also included in the tank mount and arranged to be coupled to the fuel tank and a fill tube associated with the fuel tank, wherein the clamping step comprises the steps of moving an upstream portion of the spud anchor into a groove formed in the tubular housing to compress a downstream portion of the spud anchor against the tubular housing to establish the fluid-leak barrier therebetween, wherein an O-ring seal is included in the downstream portion of the spud anchor and arranged to engage the tubular housing, wherein the downstream portion of the spud anchor further includes a tip of a weld ring and the clamping step further comprises the steps of inserting the O-ring seal into an annular channel formed in the tubular housing and moving the tip of the weld ring into the annular channel to compress the O-ring seal, and wherein the moving step includes the step of locating an upstream portion of the weld ring above an opening into the groove formed in the tubular housing and deforming the upstream portion of the weld ring to flow into and remain in the groove formed in the tubular housing and anchor to a portion of the tubular housing bounding the groove to maintain the weld ring in a fixed position on the tubular housing so as to apply a loading force via the tip to maintain the O-ring seal under compression between the tubular housing and the weld ring.

25. The process of claim 24, wherein the deforming step includes the steps of heating the upstream portion of the weld ring to cause it to flow into the groove formed in the tubular housing and then cooling the upstream portion of the weld ring in the groove to cause the upstream portion of the weld ring to remain in the groove.

* * * * *